Figure 1:
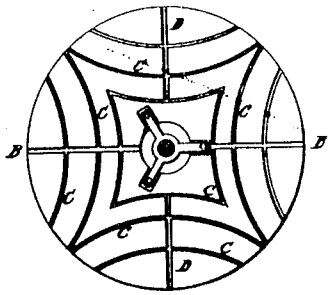
Figure 2:
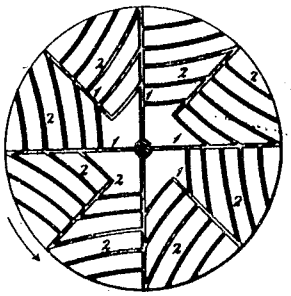
Figure 3:
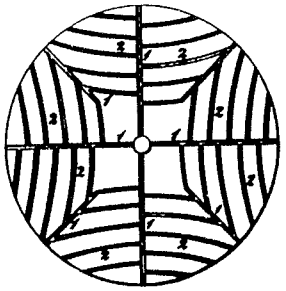

DRAFT

BEST AVAILABLE COPY

C. R. BARNES.

Millstone Dress.

No. 189.

A. I. Patented Jan'y 26, 1858.

Witnesses:

Lemuel W. Serrell.

Thomas G. Harold.

Inventor:

Chas. R. Barnes.

N. PETERS, Photo-Lithographer, Washington, D. C.